Feb. 4, 1969   R. R. SCHNEIDER   3,425,674
ROTARY KILN CONSTRUCTION
Filed June 8, 1966
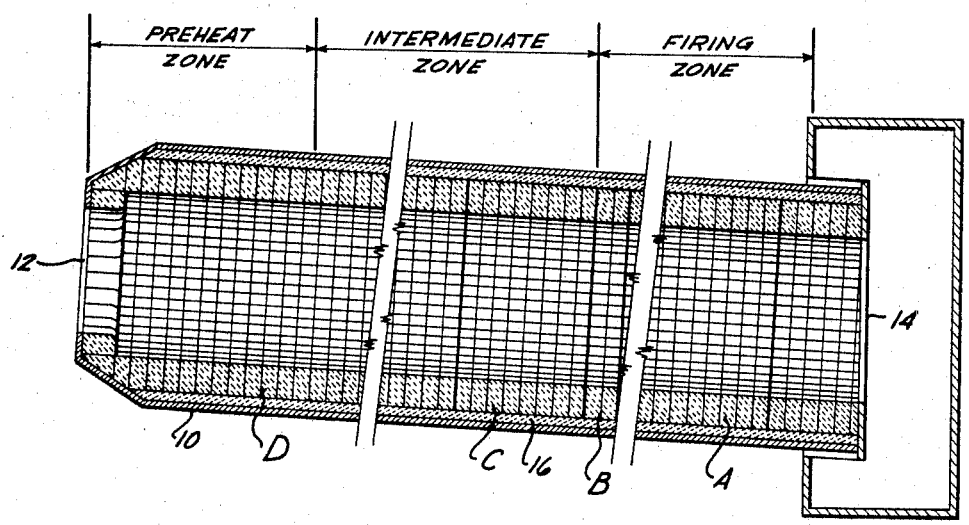
INVENTOR.
RICHARD R. SCHNEIDER
BY
ATTORNEY United States Patent Office 3,425,674
Patented Feb. 4, 1969

3,425,674
ROTARY KILN CONSTRUCTION
Richard R. Schneider, Pittsburgh, Pa., assignor to Dresser Industries, Inc., Dallas, Tex., a corporation of Delaware
Filed June 8, 1966, Ser. No. 556,153
U.S. Cl. 263—33                                   6 Claims
Int. Cl. F27b 7/28; F27d 1/00

ABSTRACT OF THE DISCLOSURE

A rotary kiln construction having a refractory lining which is divided into three sequential zones composed of a preheat zone, an intermediate zone and a firing zone, the preheat zone being composed of fireclay brick, the intermediate zone being composed from either fireclay brick or high alumina brick and at least a portion of the firing zone being fabricated from burned refractory shapes containing at least 50% fused grain.

---

The popularity of rotary kilns is based upon their ability to treat many different materials uniformly and continuously over a wide range of output capacities. Numerically, the most important are the kilns used for producing cement clinker, lime, and calcined dolomite. Rotary kilns are also used in the processing or manufacture of phosphates, alumina, magnesia, titania, zirconia, carbon or coke, manganese dioxide, lightweight aggregates, and ores of iron, chromium, lithium, and uranium; for calcining clay and bauxite, reduction of some metals, the burning of sulfur, and the processing of lithopone.

Commercial kilns range in size from those only a few yards in length and 3 to 6 feet in diameter to giants over 500 feet long and with diameters of 12 feet or more. Rotary kilns generally are divided into three zones known as the preheat zone located at the feed end, the intermediate zone centrally located, and the firing zone near the discharge end. The linings in a single kiln may be exposed to a temperature range from about 500° F. at the cooler end to over 3200° F. in the high-temperature zone. Mechanical and physical changes in the kiln load usually attend the temperature rise, and the lining in different zones of the kiln may have to resist abrasion and impact of the load, destructive action of hot gases and fumes, and corrosive chemical attack by the hot charge. Increasingly rigorous kiln conditions, imposed by higher operating temperatures or greater chemical activity of materials in contact with the linings, necessitate the use of refractories especially suited for each kiln and kiln zone.

No single refractory can economically be used to resist all the conditions throughout a rotary kiln. To obtain optimum results, it is necessary to use specific refractories for each of the various combinations of service conditions. For resistance to abrasion at the moderate temperatures which prevail in the feed ends of many kilns, hard, dense, fireclay brick often give good service. Higher temperatures require additional refractoriness, and selection may be made from high-duty fireclay brick. Super-duty fireclay brick are used in the most severe service that fireclay refractories can withstand. The mechanical strength, corrosion resistance, or refractoriness of super-duty brick make it economical to use these in the lining of portions of the intermediate zone of a kiln, depending upon the maximum temperature of operation. They may often be used advantageously at intermediate temperatures, where maximum resistance to abrasion is required.

Chemical and thermal conditions too severe for fireclay refractories require linings of high alumina or basic refractories. Basic refractories are necessarily used for the most economical operation of some kilns. "Basic brick" is a term used in the refractories art to describe refractories made from the raw materials magnesite (dead burned magnesia) and refractory grade chrome ores. Dolomite has been suggested. Those brick of magnesia and chrome ore having a predominance of magnesite are referred to as magnesite-chrome refractories, and those with a predominance of chrome ore are referred to as chrome-magnesite refractories. Basic brick have high resistance to attack by chemically basic materials, and withstand much higher temperatures than other commercially available refractories; for example, fireclay and high alumina brick. In addition, some basic brick gain resistance to chemical attack and thermal conditions by their ability to take on and hold a protective coating in various kiln operations. The main failing of basic brick generally is their sensitivity to temperature change. Rapid change (thermal shock) often results in cubing, cracking, and spalling away of the refractory brick. This spalling is also promoted by mechanical strains developed in the brick due to "pinching" caused by the thermal expansion of the brick lining. The aforementioned protective coating aids in diminishing the sensitivity of basic brick temperature change.

Another desirable feature in rotary kilns is that the entire refractory lining have a balanced service life. By balanced service life, it is meant the entire lining wears at about the same rate. To accomplish this, the refractories in each zone of the kiln must be carefully selected.

It is, therefore, an object of this invention to provide a refractory lining for the hot zone of rotary kilns operating at very high temperatures which will be more refractory and yet will take and hold a coating, will not be excessively heat conducting, and will not fail by spalling away. Other objects and advantages of this invention will become apparent by a study of the following figures and descriptions.

Another object of the invention is to provide an improved zoned refractory lining for rotary kilns having a substantially balanced service life.

In accordance with the present invention, there is provided a rotary kiln having a zoned working lining. At least a portion of the working lining of the firing zone fabricated at ceramically bonded basic refractory shapes contaning a preponderance (at least 50%) of fused grain which analyses on an oxide basis, 15 to 25% $Cr_2O_3$, 45 to 75% MgO, 4 to 20% $Al_2O_3$, 3 to 15% FeO, 0.5 to 3% $SiO_2$ and up to 3% CaO. The molar ratio of CaO to $SiO_2$ in said grain is no greater than about 2:1. The refractory grain is characterized petrographically as comprising predominantly, relatively large, abutting grains of periclase, crystals of spinel contained within said periclase grains and isolated pockets of silicates contained within the periclase grains. The remainder of the shapes may be composed of dead burned magnesite chrome ore or mixtures thereof. The balance of the working lining of the firing zone may be fabricated of refractory brick from the group magnesite-chrome (fusion cast or burned), and dead burned magnesite. The intermediate zone adjacent the firing zone is fabricated from at least one material selected from the group consisting of high alumina shapes (i.e., 50% + $Al_2O_3$, by analysis on an oxide basis) and fireclay shapes. The preheat zone is fabricated from fireclay refractory shapes (i.e., super-duty and high-duty, the latter generally being employed near the feed end of the kiln).

If desired, the entire working lining of the firing zone may be fabricated from the fused grain shapes. In a preferred embodiment, at least a portion of the intermediate zone, adjacent the firing zone is fabricated from high alumina shapes and the balance of the intermediate zone is fabricated from fireclay shapes.

The refractory brick in the portion of the firing zone of the rotary kiln is prepared from what we refer to as fused magnesite-chrome grain. The components are melted, resolidified and then comminuted before pressing and burning. The melting and resolidification of the chrome ore-magnesia mixture must be performed in a manner which insures a formation in the refractory product of a structure as previously described. This is preferably and conveniently accomplished in an electric furnace.

In practice, a chrome ore-magnesia mix, i.e., 40% chrome ore, 60% MgO, is continuously fed into a conventional electric furnace which is heated by one or more carbon electrodes and the electrodes are gradually raised and withdrawn as a melt is formed in order to permit slow and gradual resolidification of a melted material. It is essential in the present invention that the melt be rather slowly solidified so as to permit the formation of a particular structure required in the refractory, viz, large abutting periclase grains, spinel crystals contained within the periclase grains, and silicate material distributed in isolated pockets surrounded by periclase. The slow resolidification promotes nucleation and growth of large periclase grains and results in the formation of an equilibrium structure which is stable throughout the usual operating temperatures encountered in service, i.e., up to 1750° C.

Although slow solidification of the melt is essential, once solidification has occurred, the solid hearth material should be cooled rather quickly to room temperature very soon after it is formed, preferably within about 2 hours in order that thermal stresses are set up in the solidified refractory material so that the crushability of the material is greatly enhanced. That is to say, the solidified refractory material is prestressed by the quick cooling which reduces the amount of energy required in subsequent crushing operations. This feature, in conjunction with the characteristically large size of the periclase grains facilitates crushing of the material and avoids the formation of excessive fines.

The cooling of the refractory material is conveniently accomplished by water cooling the shell of the furnace in which the solidified material is contained.

In any event, slow and gradual solidification of the melt and rapid cooling of the solidified material is essential whereas quick freezing and slow cooling of the solidified material is to be avoided. Otherwise, the required equilibrium structure in the refractory material is not achieved and the advantageous properties of the shapes are not obtained.

The mass of solid refractory material obtained by the foregoing procedure is broken out of the furnace after cooling and cleaned and crushed to the desired size by any suitable techniques. The resulting particulate refractory material is characterized by high density, low porosity, and toughness, which properties are attributed to its composition, structure, and method of formation.

The preferred compositional ranges for the magnesite-chrome fused grain refractory material for the brick is 0.5 to 1.5% $SiO_2$, up to 1.0% CaO, 60 to 70% MgO, 5 to 10% FeO, 14 to 20% $Cr_2O_3$ and 4 to 10% $Al_2O_3$.

As is set forth above, the remainder of the working lining of the kiln consists of magnesia-chrome ore refractory shapes, dead burned magnesite shapes, high alumina shapes and fireclay shapes. For example, a suitable magnesite refractory is disclosed and claimed in United States Patent No. 3,141,790, to Davies et al. The refractory shapes of this patent consist of at least about 96% MgO, having no more than about 1% of $R_2O_3$ materials (i.e., $Fe_2O_3$, $Al_2O$ and $Cr_2O_3$), the remainder being CaO and $SiO_2$. Another suitable magnesite material is that disclosed and claimed in United States Patent No. 3,106,475 to Davies et al. without tar impregnation. These Davies et al. shapes are ceramically bonded magnesia shapes having at least about 96% MgO on the basis of an oxide analysis.

Suitable magnesite-chrome ore refractory shapes are disclosed and claimed in United States Patent Nos. 3,180,743 and 3,180,744, to Davies and Walther which are directed, in part, to direct bonded magnesite-chrome and chrome-magnesite brick. Other chrome magnesite brick are disclosed and claimed in United States Patent No. 3,316,107 to Havranek.

Almost any high alumina type brick may be employed. For example, a composition within the terms of United States Patent No. 3,067,050 to Miller has been found particularly suitable. The above patent discloses compositions made from batches consisting of 1 to 10% volatilized silica and the balance a coarse ground alumina refractory. Another suitable composition is that disclosed in United States Patent No. 3,251,587 to Pavlica. The patent calls for an unburned composition containing 65 to 75% of calcined South American bauxite, 10 to 20% calcined flint clay, 10 to 15% of crude flint clay and bonded with phosphoric acid.

Many types of fireclay brick can be employed some of which are proprietary products of the Harbison-Walker Refractories Company. Examples of Harbison-Walker super-duty fireclay brick are Varnon, Alamo S, and Kenmore. Examples of Harbison-Walker high duty fireclay brick are Benezet, H-W Crown, H-W Special and Woodland.

All of the above patents and applications are assigned to the assignees of the present invention.

The following examples illustrate more clearly the teachings of the present invention.

*Example I*

A mixture was prepared containing 40% transvaal chrome ore and 60% of low calcined caustic sea water magnesia. The composition of the ore and magnesia are set forth in Table I below.

TABLE I

| | Chrome ore, percent | Caustic magnesia, percent |
|---|---|---|
| $SiO_2$ | 1.6 | 1.5 |
| CaO | 0.5 | 1.0 |
| MgO | 10.8 | 97.1 |
| FeO | 25.1 | 0.3 |
| $Cr_2O_3$ | 46.0 | |
| $Al_2O_3$ | 14.2 | 0.1 |

The mixture was prepared in 5000-pound lots and was melted and resolidified in a single phase, two-electrode furnace having a water-cooled shell which was lined interiorly with partially fused magnesia-chrome ore material. The mix was fed continuously over a period of time into the furnace in the usual manner of "making a hearth" and a pool of molten material was developed in the furnace. The electrodes were gradually withdrawn as the melting proceeded with the result that the molten material gradually and slowly solidified in the furnace to "form a hearth." When the melting and resolidification of the material was completed, the solidified material was quickly cooled in the furnace by means of the cooling water provided in the furnace shell. The cooling to about room temperature took less than about 2 hours, after which the hearth material was broken out, cleaned, and then particulated into 1 in. x D lumps.

The refractory material obtained contained by analysis:

| | |
|---|---|
| $SiO_2$ | 1.38 |
| CaO | 1.57 |
| MgO | 62.55 |
| FeO | 10.64 |
| $Cr_2O_3$ | 18.21 |
| $Al_2O_3$ | 5.78 |

This material was then passed through a two gyratory crushing and part of the resulting material was processed through a vibrating mill to obtain a desired particle size distribution.

The sizing of the material obtained was as shown in Table II.

TABLE II

| Proportions, percent: | Particle size, mesh |
|---|---|
| 28 | −½ +¼ |
| 15 | −4 +8 |
| 16 | −8 +20 |
| 15 | −20 +60 |
| 6 | −60 +150 |
| 5 | −150 +325 |
| 15 | −325 |

Screening was not necessary to obtain the above distribution and the distribution can be readily reproduced due to the substantially uniform nature of the material of the present invention.

The sized material was subsequently mixed in a rotating mixer with 2.5 to 3%, by weight, of an aqueous 40% solution of Bindarene, a lignin sulfonate binder. A weighed amount of the mix was pressed to approximately 10,000 p.s.i. in a steel die to produce a brick 9″ x 2½″ or 4½″. The pressed brick was dried in a tunnel drier at 110° C. After drying, the brick was fired at 1600° C. for 3 hours to develop a ceramic bond between the refractory particles. It was found that the brick had sufficient strength for handling and installation and could be used directly in rotary kiln construction.

Magnesite-chrome fused grain shapes made in accordance with the present invention had apparent porosities between about 14 and 17%, a 25 p.s.i. load deformation at 1600° C. of from about 0.8 to 1.2 and excellent coatability in rotary kiln operation.

Example II

Fused grain samples were prepared for microscopic analysis. The chemical analysis of sample A was 1% $SiO_2$, 5.9% $Al_2O_3$, 20.4% $Cr_2O_3$, 60.7% MgO, 10.4% FeO and 0.7% CaO. The chemical composition of sample B was 14.59% $Cr_2O_3$, 71.45% MgO, 4.37% $Al_2O_3$, 7.11% FeO, 0.9% $SiO_2$ and 1.61% CaO.

Microscopically, sample A showed periclase grain appearing as a gray background. The grain contained numerous exsolved dendrites of mixed spinel and some euhedral crystals of spinel. Isolated pockets of silicates occurred throughout the grain. Cleavage lines or fractures, which are typical of periclase occurred in cleavage plains within the periclase grain. Sample B revealed portions of abutting periclase grains and the cleavage pits of the respective grains which appeared to intersect upon extension at an angle of about 26°. Further, the grain revealed the silicate material to occur in discontinuous isolated pockets separated by periclase and spinel crystals and are contained in the periclase grains.

The advantageous properties, high density, low porosity, reheat stability, superior resistance to spalling, high strength at elevated temperatures, and high resistance to corrosion from furnace gases in brick made from these fused grain are directly attributable to the structure and composition of the grain.

The strength of the brick is enhanced since the silicates in the constituent refractory material occur in pockets which act to relieve the stresses to which the brick are subjected in furnace operation. Also, since the silicates do not occur in a continuous phase, there is substantially no weakening of the brick at higher temperatures when the silicates are fluidized. This is due to the fact that the structure of the constituent refractory material comprises essentially a crystal to crystal bond.

The presence of silicates in pockets instead of a continuous phase also enhances the reheat stability and resistance to molten iron oxide and slags.

Accordingly, the prescribed compositional ranges for the magnesia-chrome fused grain refractory material of this invention are critical.

This invention will be described further in conjunction with the attached drawings. The single figure is a cross-section through a typical rotary kiln according to this invention parallel to the direction of flow.

The outer shell of the rotary kiln 10 is tubular in shape and has a feed end 12 and a discharge end 14. Directly against the shell is a backup lining 16 which is usually fire clay or insulating material. Some constructions do not require a backup. The working lining is adjacent to the backup lining. The working lining is divided into three major zones, as indicated in the drawing, the cold zone, the intermediate zone and the firing zone. Additional zones may exist if desired depending on the particular design of the kiln.

According to the present invention, the portion of the firing zone containing the fused grain magnesite-chrome refractory shapes of the specific composition set forth above is indicated generally at A. The balance of the firing zone containing either the magnesite-chrome or magnesite shapes is generally indicated at B. The portion of the intermediate zone containing the high alumina shapes is generally indicated at C and the balance of the intermediate zone and the cold zone containing the fireclay shapes is indicated at D.

It should be understood, of course, that the magnitude of the areas A, B, C and D shown in the drawing is only exemplary and could vary depending on kiln design and the temperature required in each zone. However, by providing a working lining in a rotary kiln as set forth above, many of the desired properties for a kiln lining will be realized. Further, with the above combination of refractories, an extended and balanced service life and best economy will be experienced.

In one experimental campaign, a rotary kiln having a working lining fabricated according to the present invention has survived thirteen months of service thus far without relining and is still in use.

Having thus described the invention in detail and with sufficient particularity as to enable those skilled in the art to practice it, what is desired to have protected by Letters Patent is set forth in the following claims.

I claim:

1. In rotary kilns of the type having an elongate metal shell with a lining therein comprised of a plurality of refractory brick which lining is divided into at least three sequential zones comprised of a preheat zone, an intermediate zone and a firing zone, the improvement comprising at least a portion of the firing zone being fabricated from burned refractory shapes, containing at least 50% fused grain, which analyses on an oxide basis, 15 to 25% $Cr_2O_3$, 45 to 75% MgO, 4 to 20% $Al_2O_3$, 3 to 15% FeO, 0.5 to 3% $SiO_2$ and up to 33% CaO, the molar ratio of CaO to $SiO_2$ in shapes being no greater than about 2:1, said shapes being characterized petrographically as comprising predominantly, relatively large, abutting grains of periclase, crystals of spinel contained within said periclase grains and isolated pockets of silicates contained within the periclase grains, the balance of the firing zone being fabricated from refractories selected from the group consisting of dead burned magnesite and magnesite-chrome ore brick, the intermediate zone adjacent the firing zone being fabricated from at least one refractory selected from the group consisting of high alumina brick, and fireclay brick, the cold zone being fabricated from fireclay brick.

2. The kiln of claim 1 in which the fused grain in the refractory shapes analyze on an oxide basis, 0.5 to 1.5% $SiO_2$, up to 1% CaO, 60 to 70% MgO, 5 to 10% FeO, 14 to 20% $Cr_2O_3$ and 4 to 10% $Al_2O_3$.

3. The kiln of claim 1 in which a portion of the intermediate zone adjacent the firing zone is fabricated from high alumina shapes and the balance of the intermediate zone is fabricated from fireclay shapes.

4. The kiln of claim 3 in which the fireclay shapes in the intermediate zone are super duty shapes.

5. The kiln of claim 1 in which the fireclay shapes in the preheat zone are high duty shapes.

6. The kiln of claim 1 in which the entire firing zone is fabricated from fused grain refractory shapes.

References Cited

UNITED STATES PATENTS 3,251,587   5/1966   Pavlica _____ 263—33

FOREIGN PATENTS 1,157,129   11/1963   Germany.

JOHN J. CAMBY, *Primary Examiner.*

U.S. Cl. X.R.

266—43